United States Patent [19]

Renfrow

[11] 4,058,720
[45] Nov. 15, 1977

[54] SUSPENSION MEANS FOR AUTOMOBILE FOG LIGHT

[76] Inventor: Lonnie C. Renfrow, 3625 N. Terry, Oklahoma City, Okla. 73111

[21] Appl. No.: 662,468

[22] Filed: Mar. 1, 1976

[51] Int. Cl.$^2$ ............................. B60Q 1/00; E05F 1/12
[52] U.S. Cl. ........................................ 362/82; 16/189; 180/1 R
[58] Field of Search .................. 240/57, 7.1 R, 7.1 G, 240/8.1, 8.1 A; 180/1; 16/189, 188; 293/66

[56] References Cited

U.S. PATENT DOCUMENTS

| 217,051 | 7/1879 | Bommer | 16/188 |
|---|---|---|---|
| 1,294,968 | 2/1919 | Taylor | 240/57 |
| 2,254,790 | 9/1941 | Benton | 240/57 |
| 2,596,256 | 5/1952 | Laubaugh | 240/57 X |
| 2,641,794 | 6/1953 | Raskin | 16/189 X |
| 2,662,605 | 12/1953 | Riggs | 180/1 R |

FOREIGN PATENT DOCUMENTS

| 767,556 | 5/1934 | France | 240/7.1 R |
|---|---|---|---|
| 939,554 | 2/1956 | Germany | 240/7.1 R |

*Primary Examiner*—Donald A. Griffin
*Attorney, Agent, or Firm*—Dunlap, Codding & McCarthy

[57] ABSTRACT

Means for attachment of one of two fog lights to the front bumper of an automobile, as applied to an automobile structure in which the fog lights, which are generally rectangular and have integral lugs for engagement by connecting bolts and nuts, are attached to the under side of the bumper, which is channel shaped in transverse section and is spaced apart from the body of the automobile, the fog lights being positioned rearwardly of the bumper and in use extending downwardly below the bumper, forwardly of the automobile and in close proximity to the ground, where they are most effective, penetrating the fog and illuminating the ground for some distance, also visible to oncoming traffic.

The specific improvement which comprises the invention consists of a spring biased hinged bracket which is connected to the under side of the bumper and to the top side of a fog light, and which enables the fog light to swing bodily downwardly and rearwardly about the axis of the hinge on impact.

1 Claim, 2 Drawing Figures

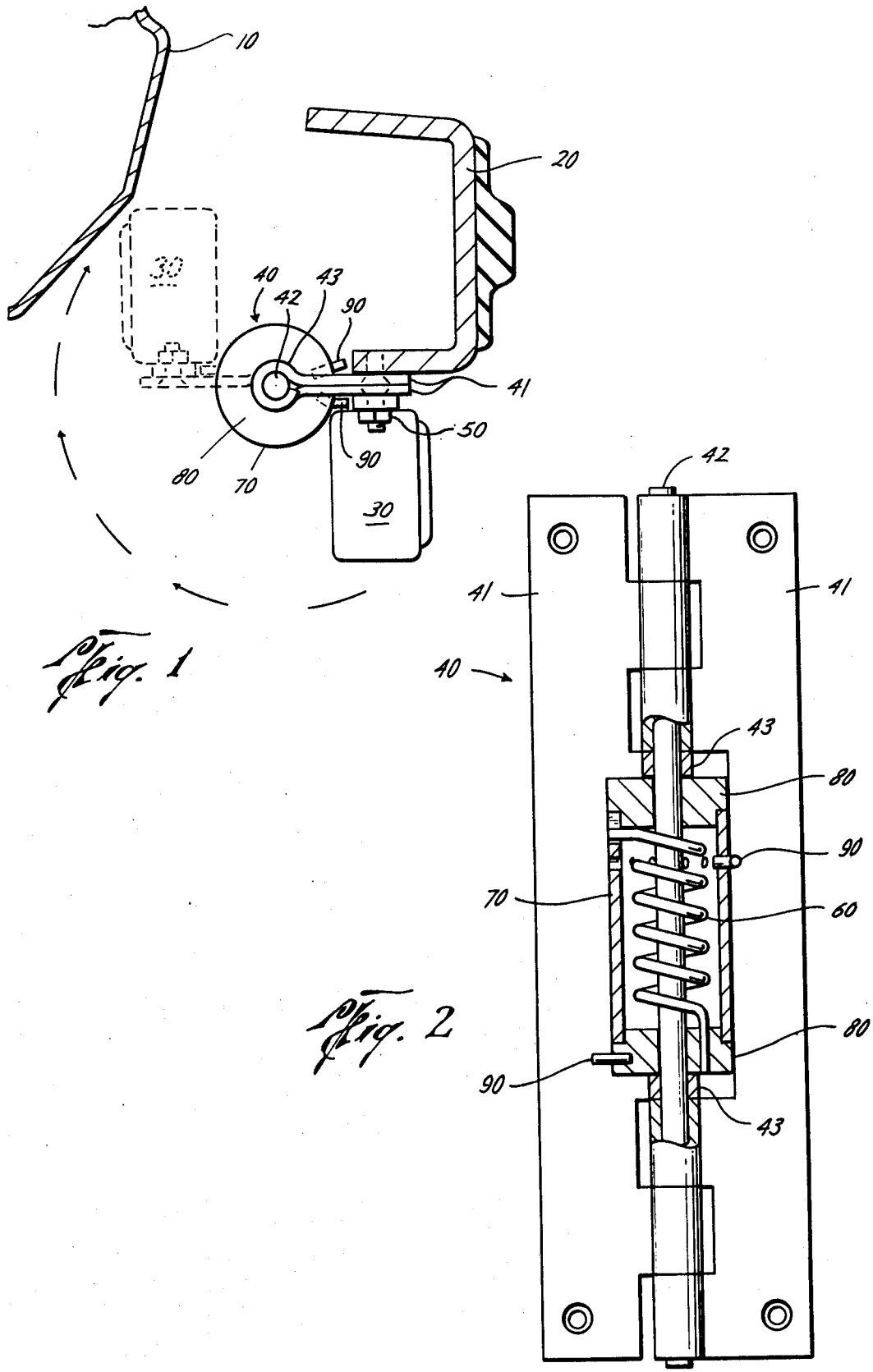

SUSPENSION MEANS FOR AUTOMOBILE FOG LIGHT

This invention relates to SUSPENSION MEANS FOR AUTOMOBILE FOG LIGHT, and it concerns more particularly means for attachment of one of two fog lights to the front bumper of an automobile.

The invention is intended primarily for attachment of a particular type of fog light to a particular type of automobile in which the fog lights, which are generally rectangular and have integral lugs for engagement by connecting bolts and nuts, are attached to the under side of the bumper, which is channel shaped in transverse section and is spaced apart from the body of the automobile.

The fog lights are positioned rearwardly of the bumper and in use extend downwardly below the bumper, forwardly of the automobile and in close proximity to the ground, where they are most effective, penetrating the fog and illuminating the ground for some distance, also visible to oncoming traffic.

Because the fog lights extend below the bumper they are unprotected, damaged on impact with low curbs and the like.

According to the invention the fog lights are each attached to the bumper by a spring biased hinged bracket which is generally similar to the hinges of a screen door, usually employed in pairs, but has novel structure as hereinafter described whereby it is peculiarly adapted for the use intended.

The spring biased hinged bracket is connected to the under side of the bumper and to the top side of the fog light, and enables the fog light to swing bodily downwardly and rearwardly about the axis of the hinge on impact, thus protecting the fog light against damage.

The spring biased hinged bracket is yieldable against the resistance of its spring on application of pressure from the front, relative to the direction of movement of the automobile in a forward direction, and returns the fog light to its normal position, in which it faces forwardly, when the pressure is released.

The invention will be readily understood by referring to the following description and the accompanying drawing, in which:

FIG. 1 shows a fog light attached to the front bumper of an automobile; and

FIG. 2 shows the spring biased hinged bracket of the invention in a detached position.

Referring to the drawing, the numeral 10 designates generally an automobile, shown fragmentarily, having a front bumper, indicated by the numeral 20, and having a pair of fog lights 30, one of which is shown, attached to the bumper 20.

The fog lights 30, which are generally rectangular and have integral lugs for engagement by connecting bolts and nuts, are each connected by a spring biased hinged bracket as hereinafter described, indicated by the numeral 40, to the under side of the bumper 20, which is channel shaped in transverse section and is spaced apart from the body of the automobile 10.

The fog lights 30 are positioned rearwardly of the bumper 20 and in use extend downwardly below the bumper 20, forwardly of the automobile 10 and in close proximity to the ground, where they are most effective, penetrating the fog and illuminating the ground for some distance, also visible to oncoming traffic.

The spring biased hinged bracket 40 enables the fog light 30 to swing bodily downwardly and rearwardly about the axis of the hinge on impact, thus protecting the fog light 30 against damage.

The spring biased hinged bracket 40 is yieldable against the resistance of its spring on application of pressure from the front, relative to the direction of movement of the automobile 10 in a forward direction, and returns the fog light 30 to its normal position, in which it faces forwardly, when the pressure is released.

The spring biased hinged bracket 40 as illustrated includes two opposite side portions 41 which are planar and elongated, the length of which approaches the maximum width of the fog light 30 to which the spring biased hinged bracket 40 is attached, in a direction parallel to the longitudinal axis of the bumper 20, transversely of the automobile 10. The two opposite side portions 41 are connected by bolts 50 to the under side of the bumper 20 and to the top of the fog light 30, respectively.

The spring biased hinged bracket 40 has a pivot pin 42 which is coextensive with its length, and the side portions 41 have integral tabs 43 adjacent their ends which are curved about the axis of the pivot pin 42, for attachment of the side portions 41 to the pivot pin 42.

A coil spring 60, which is enclosed in a cylindrical spring housing 70, open at its ends, surrounds the pivot pin 42 and is positioned intermediate its ends, between the connecting tabs 43.

A pair of collars 80 loosely encircle the pivot pin 42 and are journaled on the ends of the spring housing 70.

Opposite ends of the coil spring 60 are removably connected to one of the collars 80 and to the spring housing 70, respectively, and turn with them. One end of the coil spring 60 extends longitudinally, parallel to the pivot pin 42, and is received in a hole therefor in the adjacent collar 80, eccentrically thereof. The other end of the coil spring 60 extends radially outwardly and is received in a slot therefor in the adjacent end of the spring housing 70.

A pair of small pins 90, one of which is bent right angularly intermediate its ends because of space limitations, are received in holes therefor in the sides of the last mentioned collar 80, and the spring housing 70, and extend radially outwardly therefrom for abutting engagement with opposite side portions 41 of the spring biased hinged bracket 40, whereby the side portions 41 are yieldably urged in mutually opposed relation to each other by the action of the coil spring 60.

A series of circumferentially spaced holes are provided in the side of the spring housing 70 for selective engagement by the corresponding pin 90, and the tension which is applied to the coil spring 60 is adjustable by turning the spring housing 70 about the axis of the pivot pin 42, one of the pins 90 being in place whereby the corresponding end of the coil spring 60 is secured.

A pin similar to one of the pins 90 advantageously may be used as a lever, on inserting it in one of the series of holes in the spring housing 70, to apply torque to the spring housing 70 to turn it, to adjust the tension applied to the coil spring 60, preparatory to positioning the corresponding pin 90 in a selected one of the holes to secure the spring housing 70 in its adjusted position.

I claim:

1. In an automobile having a front bumper and a fog light, the improvement comprising:
a hinged bracket comprising:

a pivot pin having the axis thereof extending in a direction parallel to the longitudinal axis of the front bumper and transversely of the automobile;

a first planar, elongated side portion connected to the underside of the front bumper, the first side portion having integral tabs adjacent the ends of the side thereof nearest the automobile curved about the pivot pin and pivotally attaching the first side portion to the pivot pin; and a second planar, elongated side portion connected to the fog light with the fog light directed forwardly relative to automobile in a normal position of the second side portion, the second side portion having integral tabs adjacent the ends of the side thereof nearest the automobile curved about the axis of the pivot pin in alternating manner with the tabs of the first side portion and pivotally attaching the second side portion to the pivot pin; and a coil spring assembly comprising:

a coil spring having opposite ends, the coil spring being disposed coaxially around the pivot pin intermediate the ends of the pivot pin and between the tabs of the first and second side portions;

a cylindrical spring housing, open at its ends, surrounding the pivot pin and the coil spring intermediate the ends of the pivot pin and between the connecting tabs, with one end of the coil spring being removably connected to the spring housing and turning therewith;

a pair of collars loosely encircling the pivot pin and journalled on the ends of the spring housing, with the opposite end of the coil spring being removably connected to the one of the collars adjacent thereto and turning therewith; and means on the one collar and on the spring housing, extending radially outwardly therefrom for abutting engagement with the first and second side portions respectively to yieldably urge the second side portion toward the normal position thereof in response to the action of the coil spring, the tension applied to the coil spring being adjustable, as determined by the relative position of the spring housing.

* * * * *